United States Patent
Fan et al.

(10) Patent No.: US 9,424,319 B2
(45) Date of Patent: Aug. 23, 2016

(54) SOCIAL MEDIA BASED CONTENT SELECTION SYSTEM

(71) Applicant: Yahoo! Inc., Sunnyvale, CA (US)

(72) Inventors: Xin Fan, Beijing (CN); Todd Beaupre, Sunnyvale, CA (US); Jean-Marc Langlois, Menlo Park, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 180 days.

(21) Appl. No.: 14/344,759

(22) PCT Filed: Mar. 15, 2013

(86) PCT No.: PCT/CN2013/000300
§ 371 (c)(1),
(2) Date: Mar. 13, 2014

(87) PCT Pub. No.: WO2014/139055
PCT Pub. Date: Sep. 18, 2014

(65) Prior Publication Data
US 2015/0310018 A1     Oct. 29, 2015

(51) Int. Cl.
*G06F 17/30* (2006.01)
(52) U.S. Cl.
CPC .......... *G06F 17/3053* (2013.01); *G06F 17/30* (2013.01); *G06F 17/30867* (2013.01)
(58) Field of Classification Search
CPC .......... G06F 17/3053; G06F 17/30867; G06F 17/30861; G06F 17/3087; G06F 17/30876; G06F 17/3089; G06F 9/4451
See application file for complete search history.

(56) References Cited

U.S. PATENT DOCUMENTS

| | | | | |
|---|---|---|---|---|
| 6,735,596 | B2 * | 5/2004 | Corynen | G06Q 10/04 |
| 8,224,847 | B2 * | 7/2012 | Li | G06F 17/30699 |
| | | | | 707/748 |
| 8,688,691 | B2 * | 4/2014 | Ahmed | G06F 17/30867 |
| | | | | 707/723 |
| 2009/0048904 | A1 * | 2/2009 | Newton | G06Q 30/0201 |
| | | | | 705/7.29 |
| 2010/0070448 | A1 * | 3/2010 | Omoigui | H01L 27/1463 |
| | | | | 706/47 |
| 2011/0167115 | A1 | 7/2011 | Gilbert et al. | |
| 2012/0185472 | A1 * | 7/2012 | Ahmed | G06F 17/30867 |
| | | | | 707/728 |
| 2012/0324007 | A1 | 12/2012 | Werz, III et al. | |
| 2013/0036112 | A1 * | 2/2013 | Poon | G06Q 50/01 |
| | | | | 707/723 |
| 2014/0046966 | A1 * | 2/2014 | Jensen | G06F 17/30699 |
| | | | | 707/754 |

FOREIGN PATENT DOCUMENTS

WO     2012095768 A1     7/2012

OTHER PUBLICATIONS

International Search Report issued Dec. 26, 2013 in PCT/CN2013/000300.

* cited by examiner

*Primary Examiner* — Angelica Ruiz (57) ABSTRACT

A method for selecting a social media network user. The method comprises obtaining one or more parameters indicative of quality of social media network content from the social media network user, ranking the social media network user based on the one or more parameters, and determining whether the social media network user is selected based on the ranking.

17 Claims, 11 Drawing Sheets

SOCIAL MEDIA BASED CONTENT SELECTION SYSTEM

TECHNICAL FIELD

The present disclosure relates generally to systems and methods for content selection. Specifically, the present disclosure relates to content selection based on social media network data.

BACKGROUND

Many Internet search engines now have personal welcome screens for users when they log into their personal search engine accounts, e.g., through My Yahoo!® accounts. These personal home screens can be personalized by format, layout, specifying user topics, subjects of interest and by indicating preferences for online media content sources (e.g., NY Times.com, CNN.com) to display on the user's home page. The user's home page can then be updated daily, weekly, or on any other time interval specified by a the user or administrator to retrieve relevant content from sources specified by the user or administrator. In order to personalize user web pages, content sources must be mined and the content therein must be collected into a content pool.

Delivering quality and relevant content to internet service provider content pools and then to users who desire personalized content is a challenging problem. There are thousands of online content sources such as news sources, multimedia sources, blogs and other web pages that can potentially be mined for relevant content to deliver to a content pool. Current technologies permit limited personalization of user pages based on users or administrators statically identifying content sources. Current systems can retrieve the content from these sources to fill a content pool that can be used to deliver content to a user.

However, user interests, web pages, content sources, topics and trends change quickly online and often content collected from static sources may not always represent the best quality content, the hottest trending topics, news, multimedia, gossip and information that is gaining attention or popularity online. Traditional content sources are typically updated based the schedule, rules, themes and interests of the administrators hosting the particular content sources to which a user subscribes. For example, sites such as NYTimes.com™, CNN.com™, ESPN.com™ and others have schedules and rules set by the administrators of their content pages that must be adhered to when compiling and posting content to their respective web pages. Even "real-time" news sites such as Reuters or Associated Press which collect and display news at higher levels of frequency are limited by the number of authorized contributors to these sources.

Social media is quickly gaining popularity as an alternative universe for information. Users are spending more time creating personal social media pages through accounts such as Twitter™, Facebook™, Reddit™, LinkedIn™ and others. According to some estimates, there are over 1 billion Facebook users, over half a billion Twitter accounts, over 200 million LinkedIn accounts and over 40 million Reddit users. According to one estimate, Twitter alone registers over 250 million tweets a day.

Social media sites, while historically a means to connect with friends, acquaintances or followers are now increasingly being used to share content, news, articles and information that is either the original work of the user or gathered from other sources. Recognizing the popularity of social media sites such as Twitter, Facebook, etc. even companies and organizations are creating their own social media pages and posting content, Uniform Resource Locators (URLs) or other indicators from other websites. The traffic on social media sites and the content generated therein is rapidly increasing. Given the sheer volume of users of social media sites, the dynamic and evolving natures of these sites and the volume of content, postings, URLs, other content indicators and information shared on these sites, social media sites offer an excellent source of content for content personalization systems.

It would be a distinct advantage over traditional means of collecting content for any content personalization system to harness the information generated by users or curators of social media who are now acting as editorial sources for content. While the volume of users, curators and content of social media sites provides a vast array of potential sources from which to enrich a content pool, any content personalization system must be selective in the content it collects and delivers to a content pool. A content personalization system cannot practically fetch all the content generated from millions of users and curators of social media sites. Fetching all the content from all users or curators of social media sites and the content therein is not practical or desired. Some curators in social media sites are more popular than others, obtain more traffic from visitors and post higher quality content. What is needed therefore is a system and method for identifying the top curators within a social media site and obtaining the best quality content from those sites.

SUMMARY

The teachings disclosed herein relate to methods and systems for identifying content sources and enriching the content pool of personalization systems. The teachings of the systems and methods discussed herein use models to dynamically identify a relevant set of reliable users or curators from various popular social media sites. The systems and methods discussed herein also collect the URLs or other indicators from the identified reliable users or curators based on models and filter, analyze, and dynamically rank and score the URLs based on models and voting methods. According to the present teachings content pools can be dynamically updated and enriched based on the selection of relevant content obtained from URLs of the identified curators.

The following detailed description together with the accompanying drawings will provide a better understanding of the nature and advantages of various embodiments of the present teaching.

In one embodiment, a method is provided for selecting a social media network user. The method comprises obtaining one or more parameters indicative of quality of social media network content from the social media network user, ranking the social media network user based on the one or more parameters, and determining whether the social media network user is selected based on the ranking.

In another embodiment, a system is provided for selecting a social media network user. The system comprises a modeler module configured to obtain one or more parameters indicative of quality of social media network content from the social media network user and rank the social media network user based on the one or more parameters. The system further comprises a user selector module configured to determine whether the social media network user is selected based on the ranking.

In another embodiment, a non-transitory computer readable medium is provided having recorded thereon information for selecting a social media network user, wherein the information, when read by a computer, causes the computer to perform a plurality of steps. The steps comprise obtaining one or more parameters indicative of quality of social media network content from the social media network user, ranking the social media network user based on the one or more parameters, and determining whether the social media network user is selected based on the ranking.

In another embodiment, a method for content selection is provided. The method comprises identifying a reference to content associated with a social media network user having a ranking above a pre-determined level, identifying one or more occurrences of the reference attributed to at least one additional social media network user, where the one or more occurrences are indicative of popularity of the content, and selecting the reference corresponding to the content based on the popularity.

In another embodiment, a system for content selection is provided. The system comprises a reference analyzer module configured to identify a reference to content associated with a social media network user having a ranking above a pre-determined level, the reference analyzer module further configured to identify one or more occurrences of the reference attributed to at least one additional social media network user, where the one or more occurrences are indicative of popularity of the content. The system further comprises a reference selector module configured to select the reference corresponding to the content based on the popularity.

In yet another embodiment, a non-transitory computer readable medium is provided having recorded thereon information for content selection, wherein the information, when read by a computer, causes the computer to perform a plurality of steps. The steps comprise identifying a reference to content associated with a social media network user having a ranking above a pre-determined level, identifying one or more occurrences of the reference attributed to at least one additional social media network user, where the one or more occurrences are indicative of popularity of the content, and selecting the reference corresponding to the content based on the popularity.

DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 (a)-(b) are diagrams illustrating the curator identifier according to embodiments of the present teaching;

DESCRIPTION OF EXEMPLARY EMBODIMENTS

The following example embodiments and their aspects are described and illustrated in conjunction with apparatuses, methods, and systems which are meant to be illustrative examples, not limiting in scope.

Figure 1:
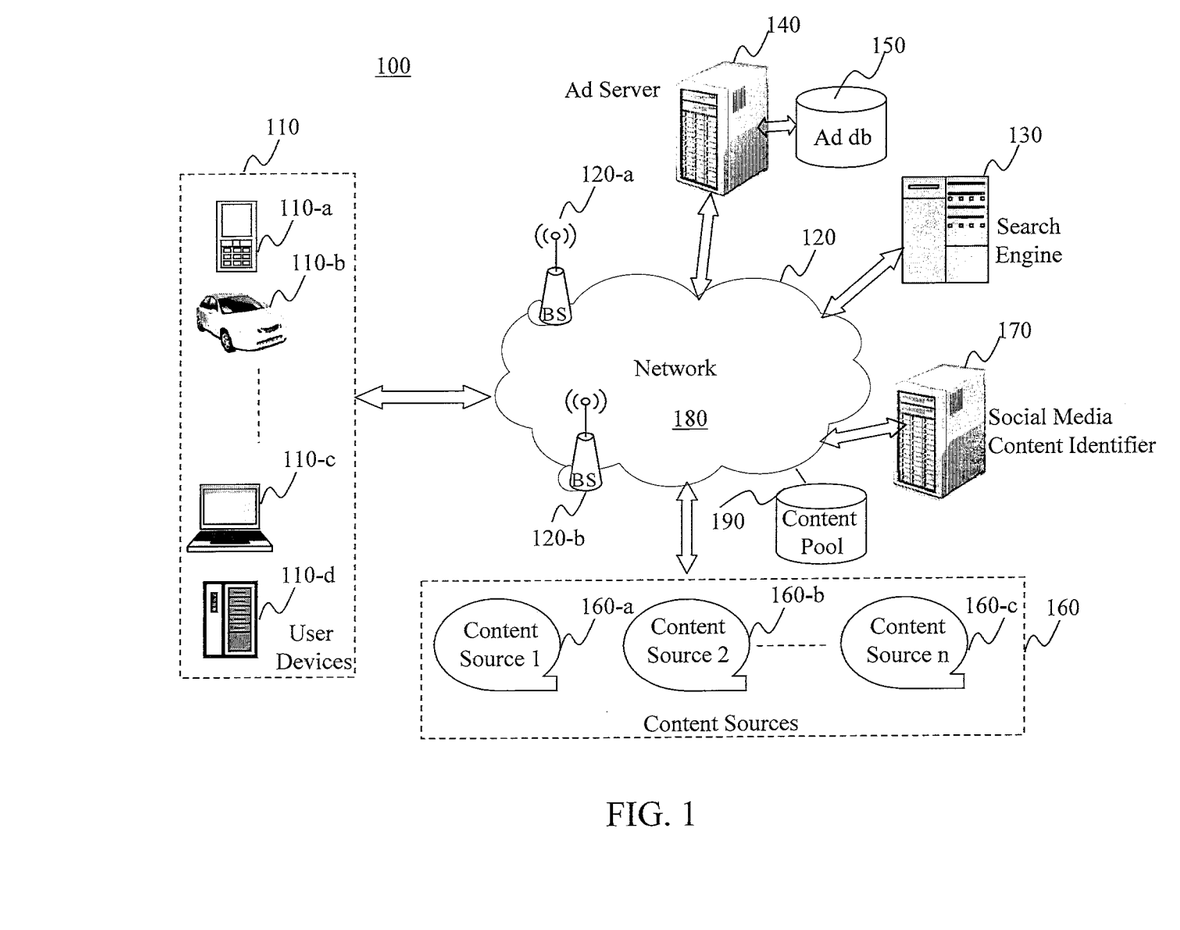
FIG. 1 is a diagram illustrating a system environment in which a social media content identifier server is deployed, in accordance with one embodiment of the present teaching.

FIG. 1 is a high level depiction of an exemplary system 100 in which a social media content identifier server 170 is deployed to select social media based content for inclusion into a content pool of a content distribution system, including a content personalization system, according to a first embodiment of the present teaching. The exemplary system 100 includes user devices 110, a network 180, a search engine 130, content sources 160, an ad server 140, and an ad database 150. The network 180 in system 100 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points 120-a, . . . , 120-b, through which a data source may connect to the network in order to transmit information via the network.

In a wireless network embodiment, the network 180 is a wireless wide area network, including a network that employs a cellular-based wireless standard, such as CDMA 2000, EV-DO, EV-DV, GSM, GPRS, EDGE, HSPDA, UMTS (Universal Mobile Telecommunications System), LTE (3GPP Long Term Evolution), or UMB (Ultra Mobile Broadband) network access technology. In other embodiments, the network 180 is a LAN (Local Area Network), a WLAN (Wireless Local Area Network) (e.g., Wi-Fi®), or a WiMAX® network.

User devices 110 include desktop computers (110-d), laptop computers (110-c), handheld devices (110-a), or built-in devices in a motor vehicle (110-b) that connect to the network 180. A user may send a query to the search engine 130 via the network 180 and receive a query result from the search engine 130 through the network 180.

The content sources 160 include multiple content sources 160-a, 160-b, . . . , 160-c. A content source may correspond to a web page host corresponding to an entity, whether an individual, a business, or an organization such as USPTO.gov, a content provider such as cnn.com and Yahoo.com, or a content feed source such as Twitter or blogs. The search engine 130 may access information from any of the content sources 160-a, 160-b, . . . , 160-c and may rely on such information to respond to a query (e.g., the search engine 130 identifies content related to keywords in the query and returns the result to a user). In various embodiments, the social media content identifier server 170 may be running on the search engine 130, at the backend of the search engine 130, or as a completely stand-alone system capable of connecting to the other system components via the network 180.

As discussed in further detail below, the social media content identifier server 170 automatically identifies a set of social media users likely to be propagating high quality content and selects corresponding content, including contend derived from Uniform Resource Locators (URLs) or other indicators shared by the selected set of users for inclusion into a content pool 190.

Figure 2:
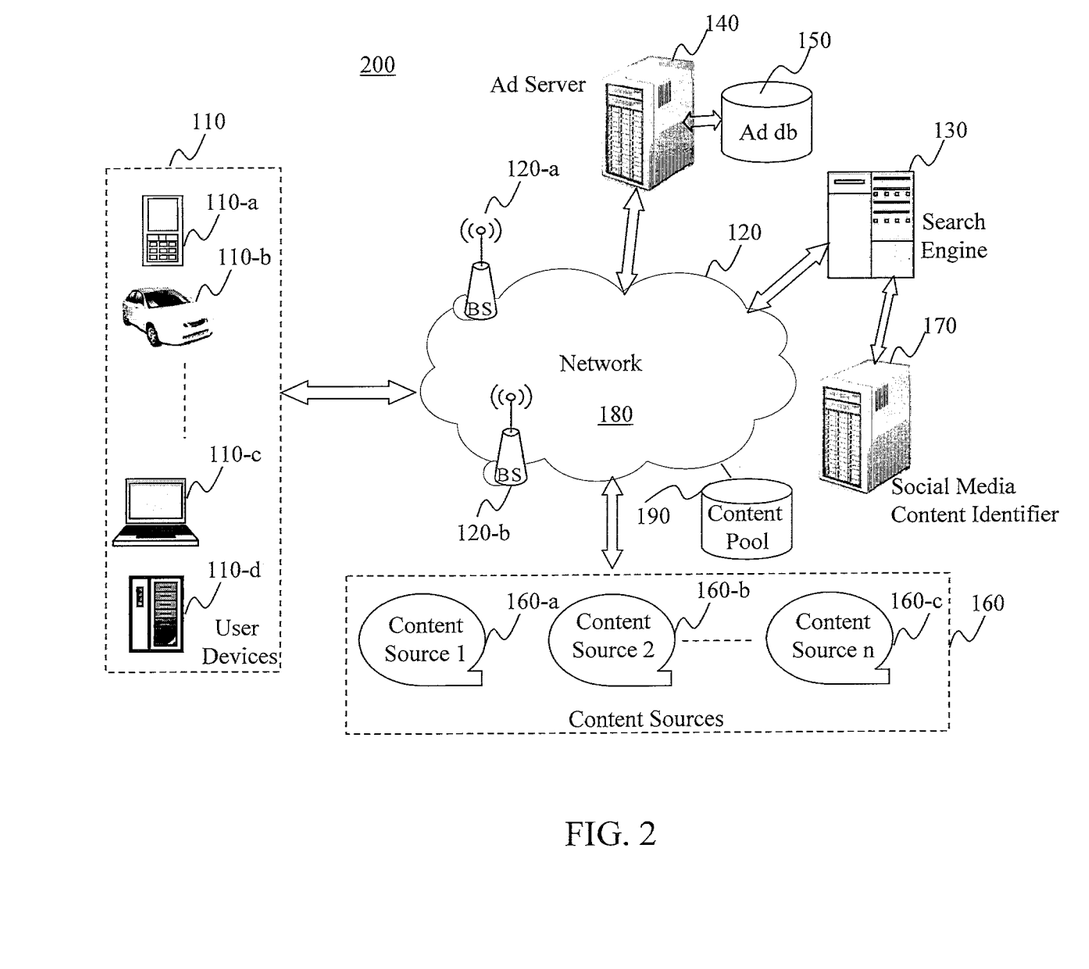
FIG. 2 is a diagram illustrating a system environment in which the social media content identifier server is deployed, in accordance with another embodiment of the present teaching.

FIG. 2 is a high level depiction of an exemplary system 200 in which the social media content identifier server 170 serves as a backend system of the search engine 130. In this embodiment, all inquiries, including the query for content are sent through the search engine 130, which then invokes the social media content identifier 170 for further processing as described herein.

Figure 3:
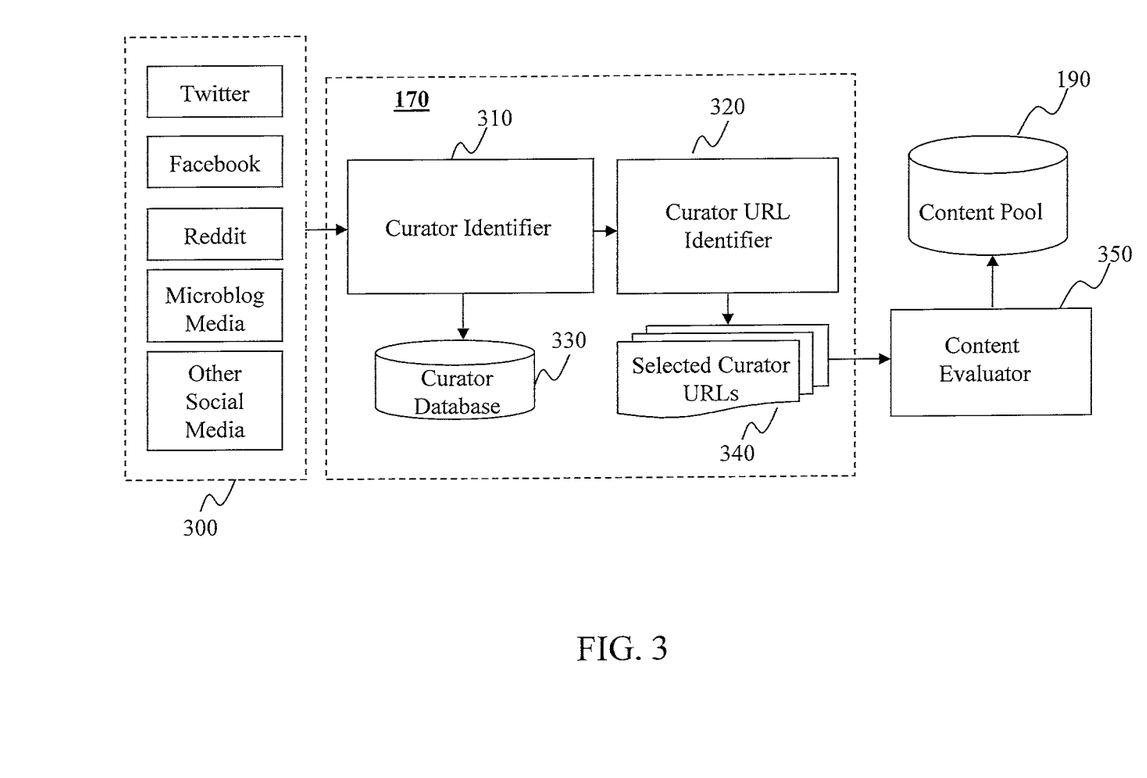
FIG. 3 is a diagram illustrating the social media content identifier in one embodiment of the present teaching.

FIG. 3 illustrates an embodiment of the social media content identifier server 170 and its environment in further detail. As illustrated in FIG. 3, the social media content identifier server 170 includes modules 310-320. In particular, the curator identifier module 310 receives social network signal feeds from one or more social media content sources 300, such as Twitter™ tweets, Facebook™ content posts, "shares," and "likes," Reddit™ feeds, microblog content posts, as well as other social media signals, and performs a multi-stage modeling analysis, including for example Gradient Boosting Decision Tree (GBDT) based modeling, to automatically identify reputable content propagators. In the following embodiments reputable content propagators identified by the curator identifier module 310 are referred to as content curators, such as reputable Twitter content curators that are likely to propagate high quality content. Although the following embodiments are described with respect to Twitter content identification, those skilled in the art will realize that the following teachings will also apply in the context of other social media signals and sites, including without limitation Facebook posts, likes, shares, comments, links, as well as microblogging content for instance. Upon identifying a set of reputable curators or reliable content sources, the curator identifier module 310 stores the curator information in the curator database 330. As discussed in further detail below with respect to FIGS. 6-7, the curator Uniform Resource Locator (URL) identifier module 320, in turn, further processes the content posted (e.g., "tweeted") by the identified social media content curators to select a set of URLs 340 or other content indicators that should be crawled and added to the content pool 190. The content evaluator 350 ranks content from the selected URLs 340 or other indicators with respect to general user population, such as by associating one or more indicators of content popularity with the selected content (e.g., by including indicators or scores based on re-tweet statistics, "like" statistics, "share" statistics, comment statistics, click rate, skip rate, scroll rate, dwell time, or the similar content popularity indicators and combinations thereof).

Figure 4A:
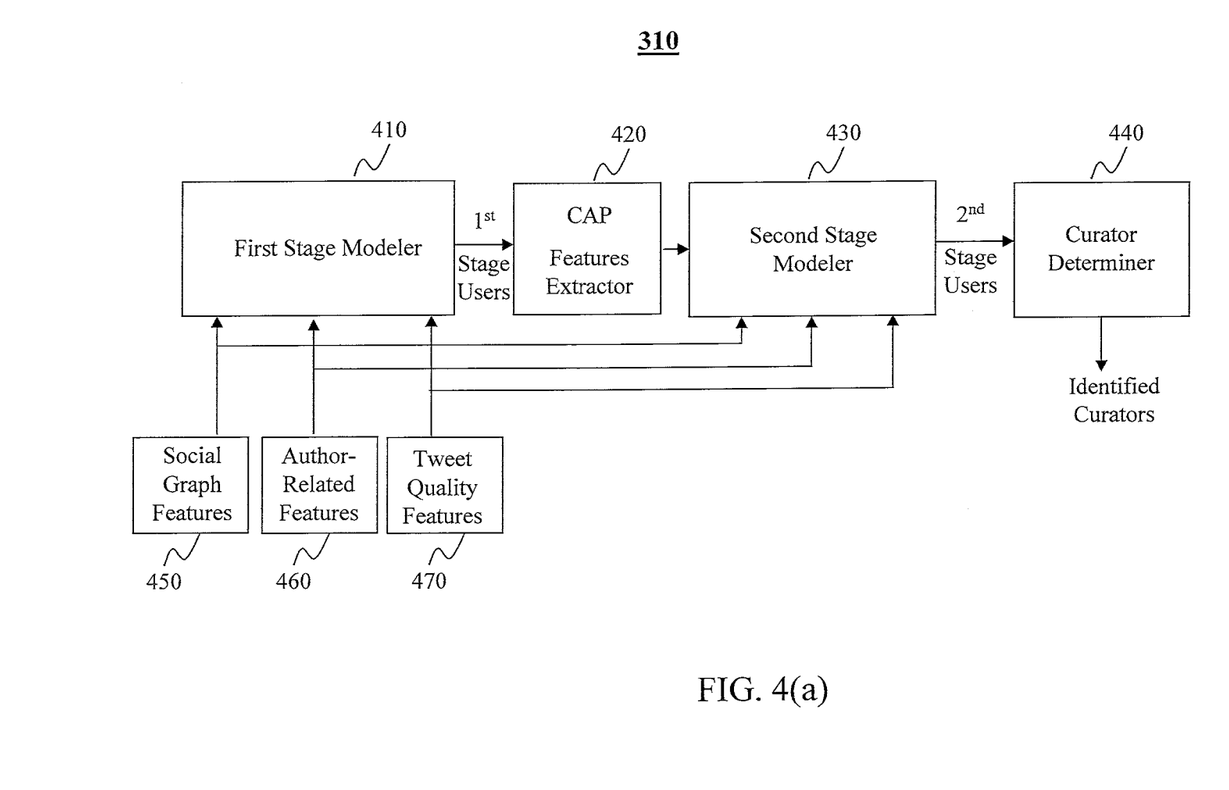

FIG. 4 (a) illustrates an embodiment of the curator identifier module 310 of FIG. 3 in further detail. The curator identifier 310 evaluates a multi-stage (e.g., two-stage) regression modeler to automatically select reputable social media content curators with top quality content. In an embodiment, each modeling module of the curator identifier 310 generates a score to rank a Twitter handle (user account id) based on a plurality of social network parameters or metrics associated with the user, as described in further detail below. Each modeling module ranks the users based on the generated score in order to select one or more sets of Twitter users with high quality content based on predetermined score threshold(s). In one embodiment, GBDT modeling and five-folded cross-validation on the training set are adopted to implement two-staged ranking of Twitter users in accordance with five score ranges corresponding to perfect, excellent, good, fair, and bad content quality. The users having scores that fall within one or more high score ranges are designated as curators. As discussed in further detail below, the URLs tweeted (or otherwise propagated through social media) by the identified reputable curators are further processed for inclusion of the underlying content into a content pool, including that of a content personalization system.

In particular, a first stage modeler module 410 receives input of social media metrics (or features) for a plurality of users, such as metrics based on Twitter data. In the illustrated embodiment, the first stage modeler 410 receives input of content quality related metrics, such as social graph features 450, author-related features 460, and tweet quality features 470 and evaluates a regression model, such as a GBDT model, in order to rank each Twitter user by assigning a first score indicative of the user's authority and content quality.

In an embodiment, the social graph features 450 include a reputation score calculated from social network graphs associated with a user's social network connections, such as user's re-tweet and/or reply graphs, via a Good, Bad, and Ugly (GBU) link-propagation algorithm. Embodiments of author-related features 460 include a plurality of features indicative of user's Twitter account status (e.g., whether the account is verified, includes a bio and/or a homepage), account follower information, tweet activity, as well as the user's ranking among a plurality of user's social media accounts. Embodiments of the tweet quality features 470 include amount of posted URLs in a predetermined time period, information related to tweet length, as well as statistics related to number of words, special characters, re-tweets, and media tweets, among others. Tables 1, 2, and 3 below illustrate an embodiment of social graph, author-related, and tweet quality features, respectively.

TABLE 1

Social Graph Features

| | |
|---|---|
| reply_score | Normalized reputation score on reply graph |
| retweet_score | Normalized reputation score on retweet graph |

TABLE 2

Author-Related Features

| | |
|---|---|
| verified_sign | When true, indicates that the user has a verified account |
| follower_count | Normalized number of followers this account currently has |
| friends_count | Normalized number of users this account is following |
| favourites_count | Normalized number of tweets this user has favorited in the account's lifetime. |
| statuses_count | Normalized number of tweets (including retweets) issued by the user |
| listed_count | Normalized number of public lists that this user is a memeber of. |
| bio | Whether has description |
| homepage | Whether has homepage |
| tweet_cnt | Normalized number of posted tweets in the week |
| retweeted_cnt | Normalized number of tweets being retweets |
| replied_cnt | Normalized number of tweets being replied |
| listorious_rank | listorious rank |
| twitter_rank | twitter rank |
| wefollow_rank | wefollow rank |

TABLE 3

Tweet Quality Features

| | |
|---|---|
| total_cnt | The number of activities |
| avg_url_cnt | Average percentage of URLs in posted tweets |
| text_len | Average length of posted tweets |
| text_wordcnt | Average number of words in posted tweets |
| avg_hashtag_cnt | Average percentage of hash tags |
| avg_mention_usercnt | Average percentage of user mentioned in posted tweets |
| avg_favorited | Average percentage of favorited tweets in all posted tweets |
| avg_retweet_cnt | Average percentage of retweets in all posted tweets |
| avg_media_cnt | Average percentage of media tweets in all posted tweets |
| avg_retweeted | Average percentage of tweets been retweeted in all posted tweets |
| avg_smile_cnt | Average number of smiling emoticon e.g. ☺☺ |
| avg_frown_cnt | Log number of frowning emoticon e.g. ☹ ;-( |
| avg_quest_mark | Average number of question mark '?' |
| avg_exclaim_mark | Average number of exclaim mark '!' |
| avg_double_quest_mark | Number of double question mark |
| age | normalized age = tweet time − registry time |
| avg_money_mark | normalized number of money mark" |
| avg_tweet_entity_cnt | Average number of Entities/Events detected in each tweet |
| avg_entity_weight | Average of weight for each entity. |
| avg_tweet_entity_weight | Average of entity's weight sum in each tweet. |

Based on the user's metrics set forth above in Tables 1-3, the first stage modeler module 410 employs a computer implemented regression model, such as based on a GBDT algorithm, to calculate the user's score indicative of the quality of content (including text and URL content) shared by the user via social media services, such as Twitter. In an alternative embodiment, the modeler module 410 calculates the user's content quality score based on Facebook or another social media account related metrics. Additionally, the first stage modeler 410 applies a predetermined score threshold filter to the set of Twitter user scores to remove users with scores indicative of low quality content. The data corresponding to the remaining users is passed on to the Contextual Analysis Platform (CAP) module 420.

The Contextual Analysis Platform (CAP) features extractor module 420 extracts a plurality of content features from the remaining set of users and assigns corresponding CAP scores to the set of users output from the first stage modeler module 410. In an embodiment, the CAP features extractor module 420 assigns scores to the set of users output by the first stage modeler 410 indicative of presence of adult content, spam content, presence of typographical errors, as well as assigns a quality score to the content of user's tweets, as illustrated in Table 4 below. In additional embodiments, the CAP features extractor module performs content analysis on user's tweets or other social media posts to assign scores to users based on a variety of other content related categories, such as grammatical consistency, presence of images, and the like.

TABLE 4

Contextual Analysis Platform (CAP) Features

| | |
|---|---|
| adult_score | Adult score of user's tweets by cap |
| spam_score | Spam score of user's tweets by cap |
| quality_score | Quality score of user's tweets by cap |
| | Fraction of typos |

The second stage modeler module 430 performs further computer implemented regression modeling, such as via GBDT technique, on the set of users that were ranked according to corresponding content quality scores by first stage modeler 410 and having corresponding CAP scores assigned by the CAP features extractor 420. In one embodiment, as shown in FIG. 4(a), the second stage modeler module 430 also receives input of the initial Twitter user set that was applied to the first stage modeler 410 (i.e., the data set of Twitter users having the social graph features 450, author-related features 460, and tweet quality features 470 discussed above in connection with module 410). The second stage modeler 430 outputs a set of Twitter users further ranked by content quality scores.

In an embodiment, second stage modeler 430 ranks the users according to five grade levels, with grade five (5) users having the highest range of content quality scores and grade two (2) users having the lowest range of content quality scores. For instance, grade five (5) indicates a "superb" content quality Twitter users, such having content corresponding to as an authoritative stream, a public figure, a well-respected enterprise, and containing URL links to consistently valuable content. Grade four (4) indicates an "excellent" user category having consistently high quality links without being a well-known figure or a well-known figure with a few content quality issues. Grade three (3) indicates an a "good" user category having meaningful content, perhaps interspersed with unrelated comments, but with some links of value. Grade two (2) indicates a "fair" user category having some content, opinion, or links, but with such content, opinion, or links being either stale, only of interest to a narrow user group, or questionable quality, or private in nature.

The curator determiner module 440, in turn, identifies a set of reputable Twitter curators based on applying a predetermined threshold to scores falling within categories corresponding to the set of users output from the second stage modeler 430. In an embodiment, the curator determiner 440 selects grade five (5) and grade four (4) users having the highest ranges of content quality scores as the reputable curator users that are likely to include URLs with high quality content. Therefore, the URLs posted by such high quality curators are considered as candidates for inclusion into a content pool of a content personalization system, as further described below.

Figure 4B:
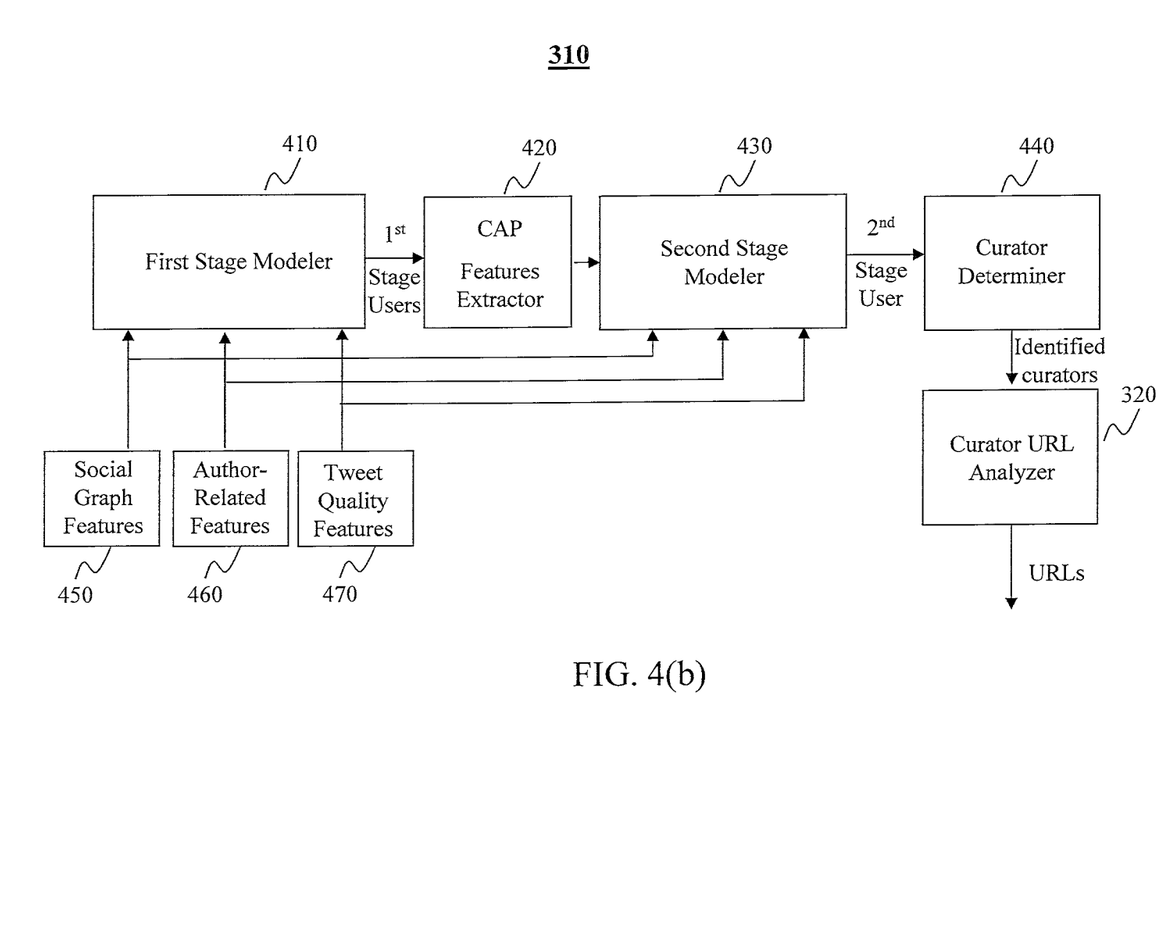

FIG. 4(b) illustrates an embodiment of the curator identifier module 310 where the curator URL identifier module 320 identifies and selects a set of reputable curator URLs as candidates for inclusion into a content pool, as further discussed in connection with FIGS. 6-7 below. In an embodiment, the curator URL identifier module 320 analyzes popularity of identified curator URLs with respect to a voter set of Twitter users that also posted or tweeted the identified curator URL. In one embodiment, the voter set of Twitter users includes the entire set of users output by the second stage modeler 430, including the reputable curator users (e.g., users having content quality scores falling within ranges (2) (fair) through (5) (superb) discussed above). In another embodiment, the voter set of users includes the users with content quality scores falling within ranges (3) (good) through (2) (fair) discussed above.

Figure 5:
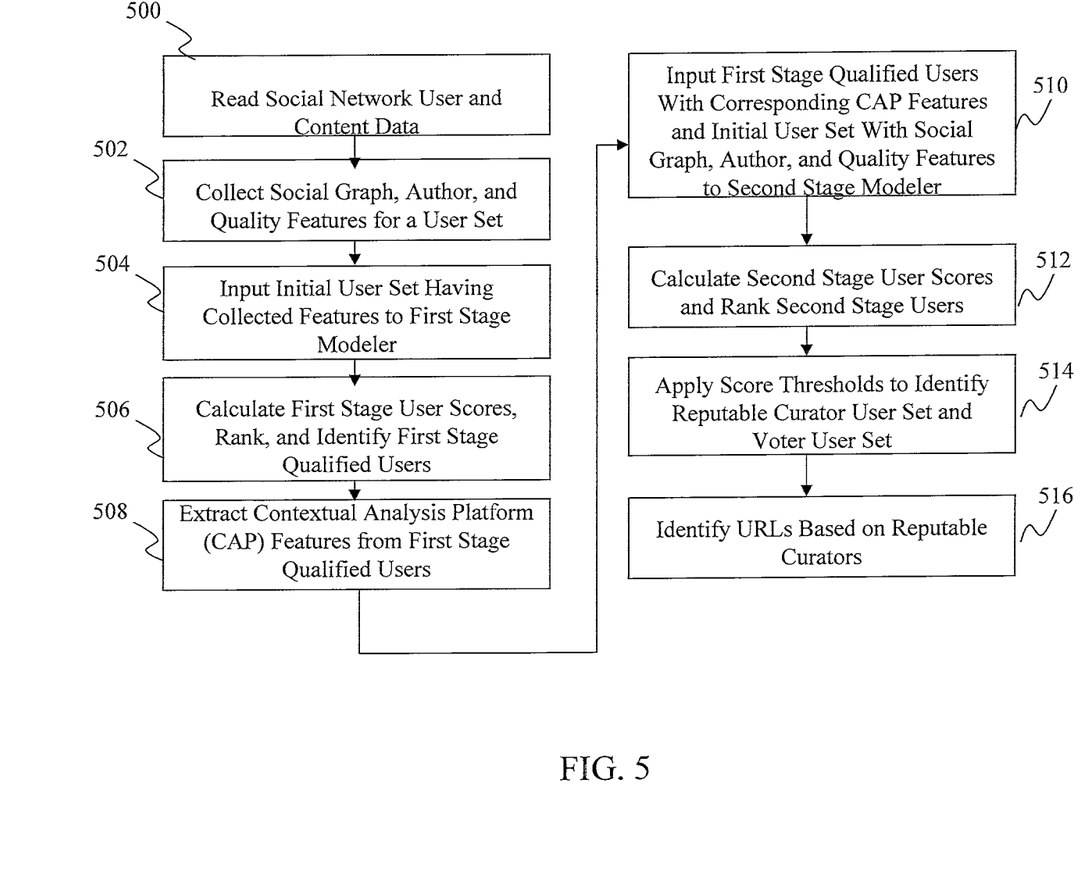
FIG. 5 is diagram illustrating a method of identifying curators and URLs according to one embodiment of the present teaching.

FIG. 5 illustrates an embodiment of a method for identifying reputable curators based on social media data. In steps 500-502, the social media identifier server 170 reads social network user and content data and collects social graph, author-related, and tweet quality related features, as discussed above, for a set of social network users, such as Twitter users. In step 504, the server 170 inputs an initial user set having the collected features to a first stage modeler 410. In step 506, the server 170 calculates scores indicative of content quality, ranks, and identifies first stage qualified users based on discarding the users that fall below a predetermined score threshold. In step 508, the server 170 performs content analysis on the user tweets to extract CAP features from the set of first stage qualified users. In steps 510-512, the server 170 inputs user data of first stage qualified users with the corresponding CAP features, and in an embodiment the initial user data set with the social graph, author-related, and tweet quality-related features, to the second stage modeler described above, calculates second stage content quality scores, and ranks the users accordingly. In step 514, the server 170 applies predetermined score thresholds discussed above with respect to FIGS. 4($a$)-4($b$) to identify a set of reputable curator users likely to be tweeting or otherwise propagating high quality URLs or other indicators and, in an embodiment, identifies a voter user set for determining popularity of URLs in the set of reputable curators. Finally, in step 516, the server 170 identifies URLs corresponding to the identified reputable curator users for further processing, including for determining the URL popularity based on their prevalence among the set of voter users, as discussed in further detail below.

Figure 6:
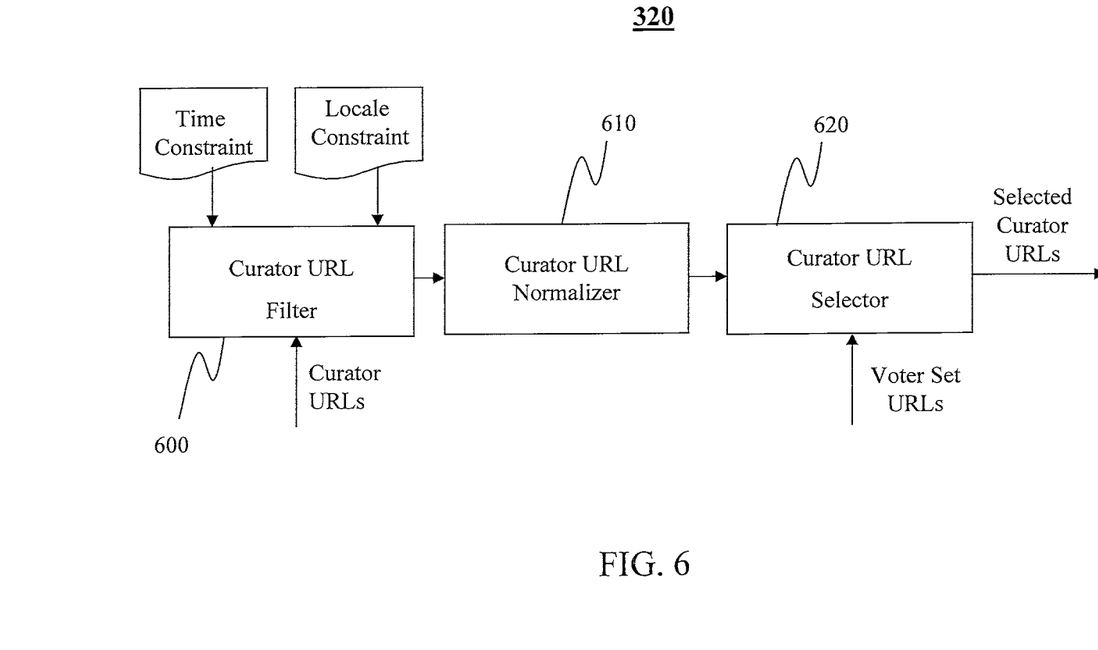
FIG. 6 is a diagram illustrating the Curator URL identifier according to an embodiment of the present teaching.

FIG. 6 illustrates an embodiment of the curator URL identifier module 320 of FIG. 3 in further detail. In one embodiment, the curator URL identifier module 320 is responsible for filtering, normalizing and selecting the best or optimal URLs to use for the content pool. As depicted here, the curator URLs feed into the curator URL filter 600. The curator URL filter 600 can filter the URLs based on time constraint values, user location constraint values or any other criteria to narrow the batch of incoming URLs. Additional filters may include, for example, removing URLs from adult sites or blocked sites. The curator URL normalizer 610 can then normalize the selected URLs by modifying and standardizing the semantics of the URLs to eliminate redundancy, duplicates, and non-functional URLs. Once the URLs have been normalized, the URLs then pass to the curator URL selector module 620. In one embodiment, the curator URL selector module 620 ranks the URLs based on a voting score (depicted in FIG. 6 as Voter Set URLs) that may reflect how often the URL was posted, re-tweeted or otherwise shared by a voter user set population. A voting score can refer to any value used to assign the relative importance or popularity of the subject URL. It should be noted that in some embodiments a score can be a percent of voters, either within an entire voter user set population or within a voter set corresponding to users of the reputable curator's social media site, that have tweeted, re-tweeted, posted or shared the subject URL. The curator URL selector module 620 can employ any number of methods and models to assign scores and rank URLs.

In one embodiment, a voter URL set is determined based on a ranking of the users as discussed herein with respect to FIG. 4. Based on the ranking of the content quality, a user set that has received relatively high ratings but has not achieved the threshold to become reputable curators, can be used as the basis to identify a set of "voters". As discussed above, in some embodiments the voter user set may also include the reputable curator users, while alternate embodiments partition the voter set below a predetermined content quality score. For example, while curators may have received a score of "superb" or "excellent", a set of potential curators may have received a score of "Good" or "Fair" based on a two-stage ranking architecture described above with reference to FIGS. 4 ($a$)-4 ($b$), as well as based on any number of ranking methods that are known to one of ordinary skill in the art. The voters may include highly regarded social media users that are not necessarily chosen as curators by the system, but meet sufficient quality standards and metrics to qualify as voters.

Once voters are identified, as discussed above, voter URLs corresponding to the subject reputable curator URLs are identified. As shown in FIG. 6, the voter set URLs are then provided as input to the curator URL selector 630 which can compare the prevalence or popularity of the subject URL among the voter user set and outputs a selected reputable curator URL having prevalence of occurrence or popularity among the voter set that exceeds a predetermined threshold, such as a predetermined percentage. In one embodiment, selected curator URLs are determined by a popularity score, which is calculated by counting how many Twitter voters tweeted the subject URL in a time window. In other social media contexts, the popularity score can be calculated based on the post rate, share rate, click rate or any number of factors which measures an indicia of popularity of that particular URL. Alternatively or in addition, selected curator URLs are determined by summing the weighted votes by the predicted curator scores.

In some embodiments the score and rank of the URL can be based on the collective wisdom of the users of that particular social media site from which the URL was obtained. In another embodiment, the URLs can be scored and ranked based on the collective wisdom off all social media sites. In yet another embodiment, the URL can be ranked based on how often the URL or indicator shows up in search results or how often it shows up on web pages crawled by the internet service provider.

Using Twitter as an example, the curator URL selector module 620 can tally the total number of Twitter users that tweeted a certain URL within a certain time period. In an embodiment, the curator URL selector module 620 ranks the URLs based on the popularity of the content. For example, even if a URL does not have the highest "share" or "tweet" rate, it may get ranked higher if the topic of the URL has a high trend rate. In the Facebook scenario, the curator URL selector module 620 may score and rank the URL based on how many times the URL shows up in a Facebook post or how often it was given a "like" rating, or was "shared". Once the URLs are voted, scored and ranked, the curator URL selector module selects the top ranked reputable curator URLs and sends them to the content evaluator 350 as shown in FIG. 3.

According to one embodiment of the present teaching, the URLs which are scored and ranked can be further categorized using any logical categorization methods such as "top trending", by topic, by "top curator" or "topic specific curator". The additional categorization of the URLs allows the system to feed the content pool in an organized and systematic manner.

Figure 7:
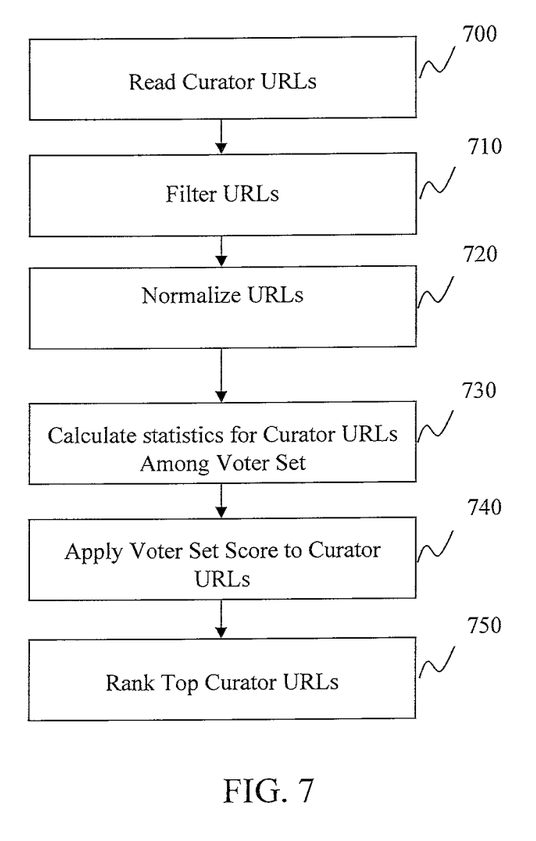
FIG. 7 is a diagram illustrating a method of identifying URLs according to an embodiment of the present teaching.

FIG. 7 depicts an exemplary method for selecting the top trending curator URLs according one embodiment of the teachings. The method begins with step 700 where the curator URLs are read by the system. Once the curator URLs are read, in step 710 the URLs are then filtered. As discussed herein, the filtering of the URLs can apply any number of logical criteria such as time and location. After filtering the URLs, in step 720 the URLs are then normalized. The method then proceeds to step 730 where statistics on the URLs are calculated based on a voter set. The statistics on the URLs can be calculated by any number of methods as discussed herein or as known by one of ordinary skill in the art. As discussed herein, any number of statistics (e.g., popularity, posting, tweeting, re-tweeting, e-mailing, number of "likes", number of "shares," click number in the search result, among others) can be used to determine the score of the given URLs. Once voter statistics are gathered, in step 740 a voter set score can be applied to the URLs in order to rank the URLs. In step 750, the score is then used to rank the URLs. According to one embodiment of the present teaching, top ranked URLs are given priority and selected for the content pool.

Figure 8:
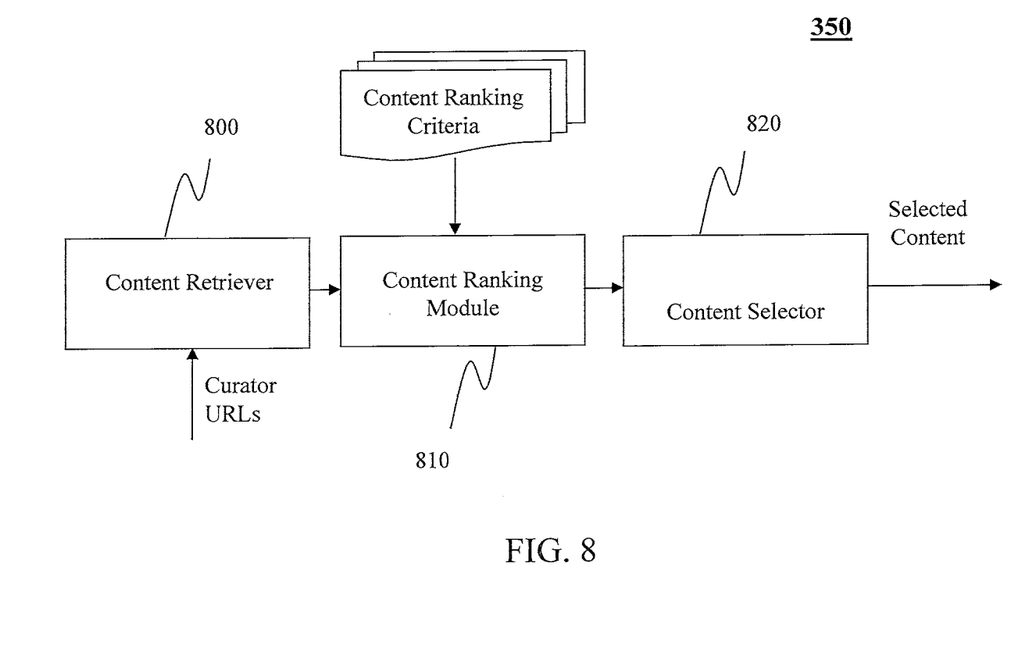
FIG. 8 is a diagram illustrating a method of the content evaluator according to an embodiment of the present teaching.

FIG. 8 depicts the content evaluator 350 as illustrated in FIG. 3 according to one embodiment. As discussed herein the content evaluator 350 analyzes the content of the selected URLs of curator URL identifier 320. As shown in FIG. 8, the content evaluator 350 can further refine the selection of curator URLs or content based on content criteria. As shown, the content retriever module 800 obtains the selected reputable curator URL content from the set of selected and ranked curator URLs. The content ranking module 810 then ranks the content based on content ranking criteria which can be any number of criteria can used to score the quality or importance of the content, for instance with respect to a general user population. For example, the content ranking criteria can be based the popularity of the content in the social media site from which the URL was obtained. It can also be based on the general popularity of the content measured by any number of factors such as: popular trending articles, top content websites by number of visitors, number of times the content was viewed by users of the internet service, number tweets in which the content appeared, the length of time the content is trending, number of times the content was posted or referred to in Facebook or other social media sites, etc. The content selector 820 then selects the content based on the rank of the content and feeds the content to the content pool as shown in FIG. 3.

Figure 9:
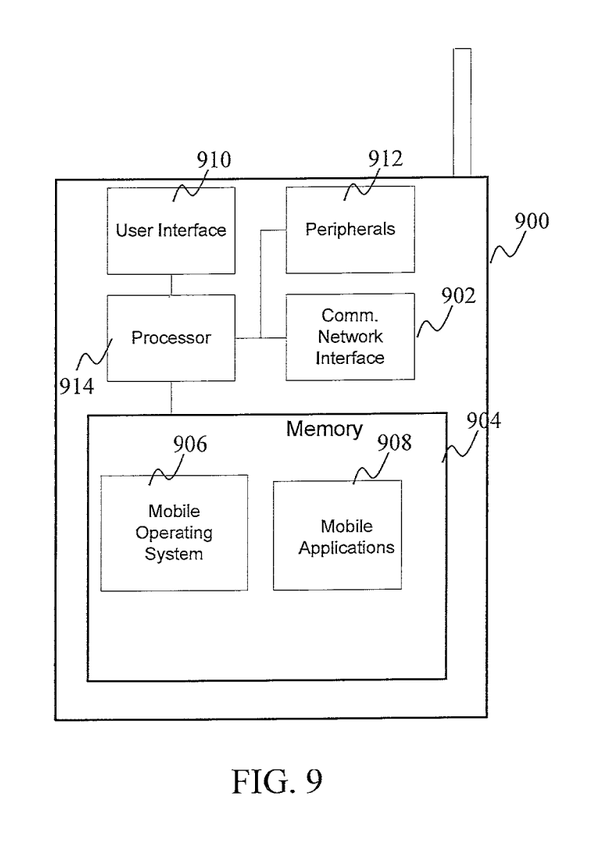
FIG. 9 is a diagram illustrating a user device, on which at least a part of the present teaching can be implemented.

FIG. 9 illustrates an embodiment of a user device 110. In the illustrated embodiment, the user device 110 is a wireless device 900, such as a cellular telephone, smartphone, tablet computer or PDA, having a communication interface 910 compatible with the network 180. The mobile device 900 further includes a processor 914 executing computer readable instructions stored in memory 904, including instructions corresponding to the mobile operating system 906 and mobile applications 908. The mobile device 900 further includes peripherals 912, such as USB connectors for data transfer and charging. The user interface 910 includes a touch screen and/or a keyboard for receiving user input and displaying the content, including content social media based content identified by the social media content identifier server 170.

Generally, to implement the present teaching, computer hardware platforms may be used as the hardware platform(s) for one or more of the elements described herein (e.g., the social media content identifier server 170, and/or the user device 110). The hardware elements, operating systems and programming languages of such computers are conventional in nature, and it is presumed that those skilled in the art are adequately familiar therewith to adapt those technologies to implement the ad modality/format selection and modification as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 10:
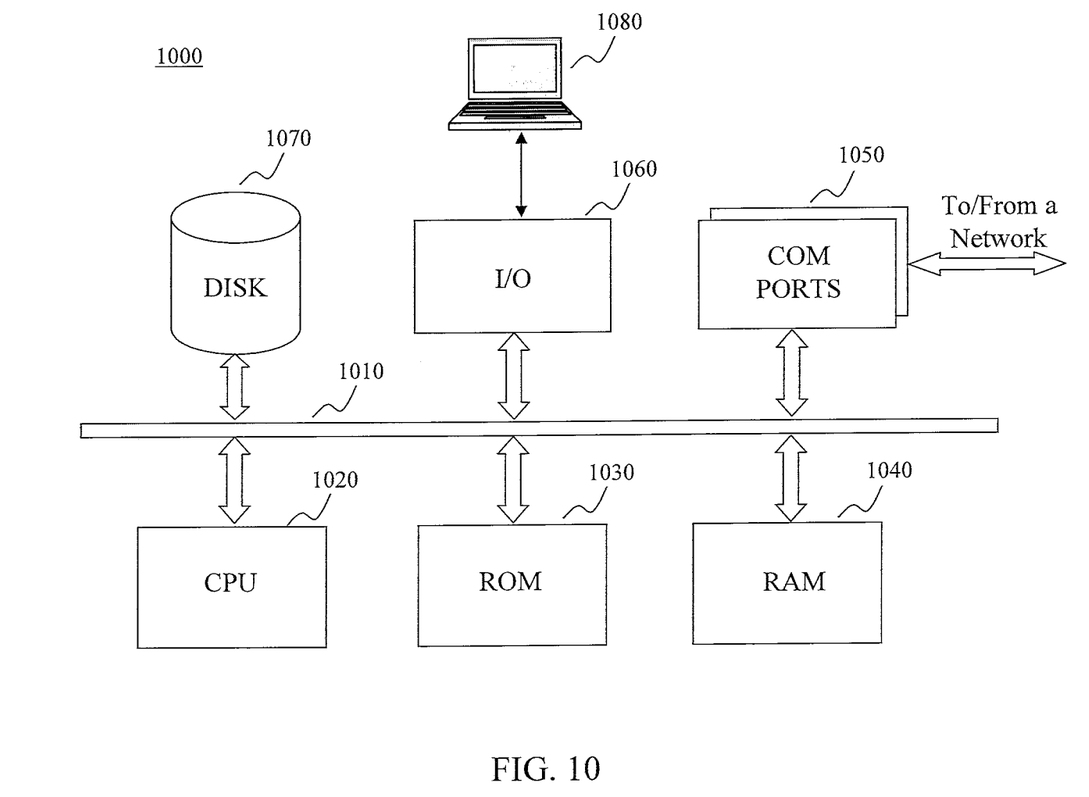
FIG. 10 is a diagram illustrating a general computer architecture on which at least a part of the present teaching can be implemented.

FIG. 10 depicts a general computer architecture on which the present teaching can be implemented and has a functional block diagram illustration of a computer hardware platform which includes user interface elements. The computer may be a general purpose computer or a special purpose computer. This computer 1000 can be used to implement any components of the social media content identifier server 170 as described herein, including via hardware, software program, firmware, or a combination thereof. Although only one such computer is shown, for convenience, the computer functions relating to ad modality selection may be implemented in a distributed fashion on a number of similar platforms, to distribute the processing load.

The computer 1000, for example, includes COM ports 1050 connected to and from a network connected thereto to facilitate data communications. The computer 1000 also includes a central processing unit (CPU) 1020, in the form of one or more processors, for executing program instructions. The exemplary computer platform includes an internal communication bus 1010, program storage and data storage of different forms, e.g., disk 1070, read only memory (ROM) 1030, or random access memory (RAM) 1040, for various data files to be processed and/or communicated by the computer, as well as possibly program instructions to be executed by the CPU. The computer 1000 also includes an I/O component 1060, supporting input/output flows between the computer and other components therein such as user interface elements 1080. The computer 1000 may also receive programming and data via network communications.

Hence, at least some aspects of the methods of the methods described herein may be embodied in programming. Program aspects of the technology may be thought of as "products" or "articles of manufacture" typically in the form of executable code and/or associated data that is carried on, embodied in, or physically stored on a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, between the search engine 130 and the social media content identifier server 170. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the ad modality selection server and its components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for selecting a social media network user, the method implemented on a machine having at least one processor, storage, and a communication interface connected to a network, the method comprising:
    obtaining one or more parameters indicative of quality of a plurality pieces of social media network content, wherein each of a plurality of users is associated with one or more of the plurality pieces of social media network content;
    ranking the plurality of social media network users based on the one or more parameters; and
    selecting, based on the ranking, at least one of the plurality of social media network users as a curator and at least some of the plurality of social media network users as a voters, wherein
    at least some of social media network content associated with the curator is added to a content pool based on popularity of the social media network content among the voters.

2. The method of claim 1, wherein the one or more parameters include features related to at least one of:
    the social media network user;
    social network connections of the social media network user; and
    the social media network content associated with the social media network user.

3. The method of claim 1, wherein the plurality of social media network users are ranked based on the one or more parameters using a first model.

4. The method of claim 3, wherein each of the ranked social media network users is assigned into one of a plurality of levels based, at least in part, on the one or more parameters using a second model.

5. The method of claim 4, wherein each of the social media network users is assigned into one of the plurality of levels based, at least in part, on social status of the social media network user.

6. The method of claim 1, further comprising:
    extracting features from each of the plurality of social media network content associated with the plurality of social media network users.

7. A system having at least one processor, storage, and a communication interface connected to a network for selecting a social media network user, the system comprising:
    a modeler configured to obtain one or more parameters indicative of quality of a plurality pieces of social media network content, wherein each of a plurality of users is associated with one or more of the plurality pieces of social media network content; and
    a user selector configured to rank the plurality of social media network users based on the one or more parameters, and select, based on the ranking, at least one of the plurality of social media network users as a curator and at least some of the plurality of social media network users as a voters, wherein
    at least some of social media network content associated with the curator is added to a content pool based on popularity of the social media network content among the voters.

8. The system of claim 7, wherein the one or more parameters include features related to at least one of:
    the social media network user;
    social network connections of the social media network user; and
    the social media network content associated with the social media network user.

9. The system of claim 7, wherein the plurality of social media network users are ranked based on the one or more parameters using a first model.

10. The system of claim 9, wherein each of the ranked social media network users is assigned into one of a plurality of levels based, at least in part, on the one or more parameters using a second model.

11. The system of claim 10, wherein each of the social media network users is assigned into one of the plurality of levels based, at least in part, on social status of the social media network user.

12. The system of claim 7, further comprising a feature extractor configured to extract features from each of the plurality of social media network content associated with the plurality of social media network users.

13. A non-transitory machine readable medium having information recorded thereon for selecting a social media network user, wherein the information, when read by a machine, causes the machine to perform the steps of:
    obtaining one or more parameters indicative of quality of a plurality pieces of social media network content, wherein each of a plurality of users is associated with one or more of the plurality pieces of social media network content;
    ranking the plurality of social media network users based on the one or more parameters; and
    selecting, based on the ranking, at least one of the plurality of social media network users as a curator and at least some of the plurality of social media network users as a voters, wherein
    at least some of social media network content associated with the curator is added to a content pool based on popularity of the social media network content among the voters.

14. The medium of claim 13, wherein the one or more parameters include features related to at least one of:
   the social media network user;
   social network connections of the social media network user; and
   the social media network content associated with the social media network user.

15. The medium of claim 13, wherein the plurality of social media network users are ranked based on the one or more parameters using a first model.

16. The medium of claim 15, wherein each of the ranked social media network users is assigned into one of a plurality of levels based, at least in part, on the one or more parameters using a second model.

17. The medium of claim 16, wherein each of the social media network users is assigned into one of the plurality of levels based, at least in part, on social status of the social media network user.

\* \* \* \* \*